Sept. 25, 1934.   M. R. MESING   1,974,620
NONCHATTERING REAMER
Filed July 17, 1933
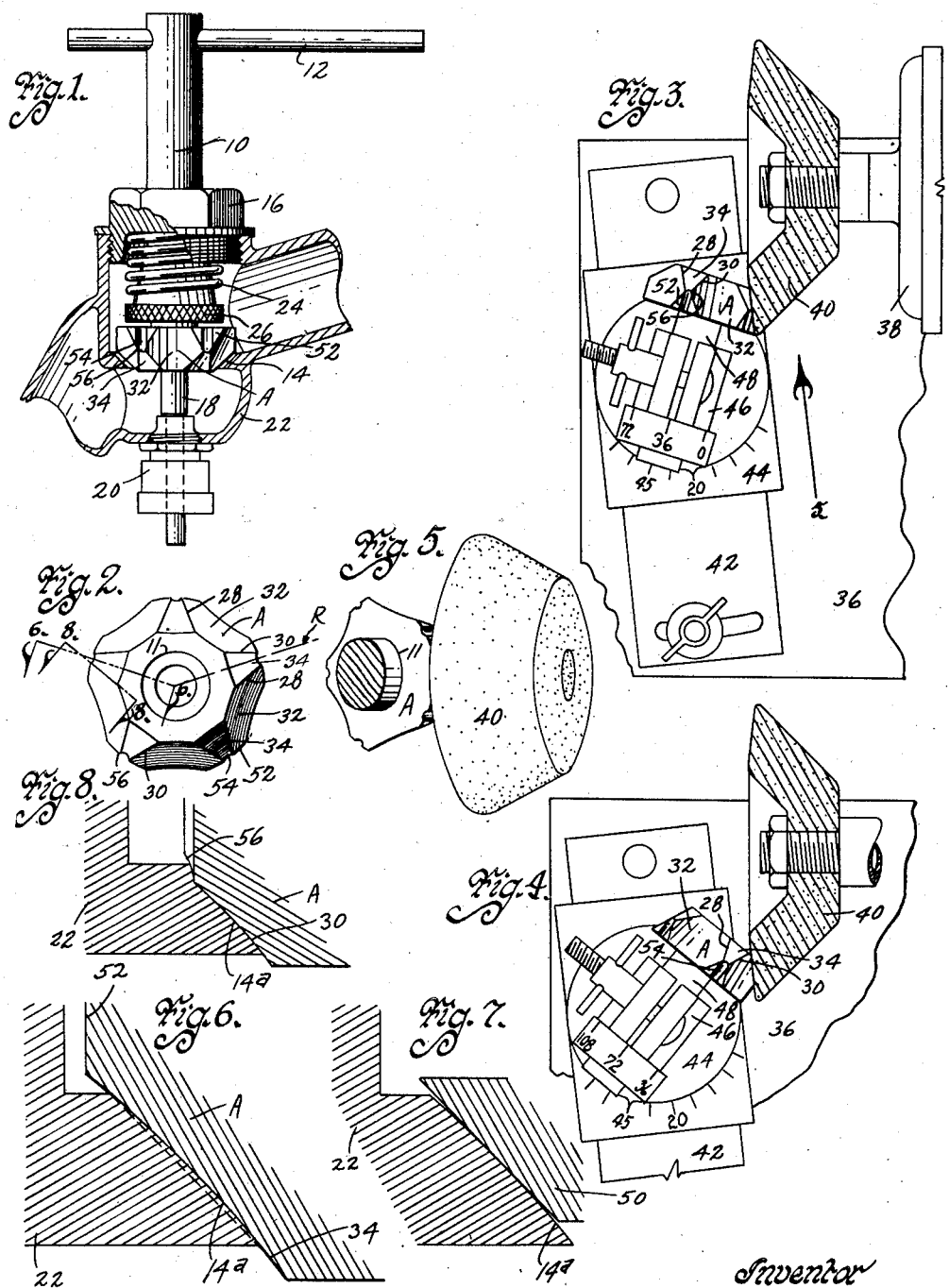

Patented Sept. 25, 1934

1,974,620

UNITED STATES PATENT OFFICE 1,974,620

NONCHATTERING REAMER

Maximillian R. Mesing, Algona, Iowa, assignor of one-third to Morris H. Aliber, one-third to Robert Aliber, and one-third to Marvin M. Aliber, all of Des Moines, Iowa Application July 17, 1933, Serial No. 680,754

2 Claims. (Cl. 90—12.5)

The object of my invention is to provide a nonchattering reamer which is simple, durable and comparatively inexpensive to manufacture.

A further object is to provide a non-chattering reamer which can be quickly initially formed and quickly re-ground for sharpening the same without changing the original cutting edges or the shape of the hole reamed by the reamer.

Another object is to provide a reamer which has cutting edges progressively inclined in opposite directions to avoid chattering of the reamer against the work being reamed thereby, a common fault especially when brass or bronze is being reamed.

Still a further object is to provide a reamer construction in which the reamer can be set in a grinding machine at a certain angle with respect to its travel therein and half the faces thereof ground and then by a single additional re-setting the other half can be ground, whereby the resultant reamer has a number of cutting edges which are alternately inclined in opposite directions to thus produce cutting edges which do not chatter against the work and as a consequence, cause rough reaming thereof.

Still another object is to slightly "hollow grind" the alternate faces and form them at different angles with respect to the axis of the reamer so that a very slight hollowness occurs along the cutting edges of the reamer, resulting in a very slight curvature on the work being reamed, which, as hereinafter more fully explained, is very desirable.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a reamer construction embodying my invention, showing it being used for reaming out a valve seat.

Figure 2 is a bottom view of the reamer body.

Figure 3 is a plan view of the reamer body being ground in a grinding machine, the machine being set for grinding half the faces of the reamer at a certain angle relative to the axis thereof.

Figure 4 is a similar view showing the reamer reset for grinding the other half of the faces at a different angle relative to the axis of the reamer.

Figure 5 is a view of the grinding wheel and reamer in the direction of the arrow 5 on Figure 3 to show how hollow grinding of the faces is effected.

Figure 6 is a greatly enlarged sectional view showing the reamer reaming out a valve seat and taken on the line 6—6 of Figure 2.

Figure 7 is a similar view showing a valve seated against the seat; and

Figure 8 is a similar view showing the reamer reaming a valve seat which has been reamed quite a number of times before and taken on the line 8—8 of Figure 2.

On the accompanying drawing, I have used the reference character A to indicate generally a reamer body. It is preferably provided with a shank 10, whereby the reamer body may be rotated during the reaming process.

The shank 10 may be driven by suitable power means or rotated by hand, a cross pin 12 being provided for hand rotation.

When the reamer is provided for a valve seat 14, as shown in Figure 1, suitable aligning devices can be used. For instance, I show a nut 16 for the shank 10 and a shank extension pin 18 extending through a bearing 20 on the lower end of a valve body 22 in which the seat 14 is formed. The reamer may be used without a spring or a spring 24 may be interposed between the nut 16 and a flange 26 of the shank 10 to produce the desired pressure of the reamer body A on the seat 14, if desired. In case the reamer takes hold too readily when cutting, a spring can be placed between the reamer body A and the bearing 20 instead of as shown on the drawing.

My reamer is of the non-chattering type produced by arranging alternate cutting edges 28 and 30 at different angles relative to a radial line. For instance, in Figure 2, these angles can be compared to the radial line R.

Heretofore, cutting edges have been used at different angles for the prevention of chattering, but for each cutting edge, one or two grinding operations with the grinding machine set at a different angle for each one, had to be provided. In my reamer, I provide full depth cutting faces 32 and partial depth cutting faces 34 which are at different angles relative to the axis of the reamer, as perhaps best shown in Figures 3 and 4, respectively.

All the faces 32 are at one angle, for instance twenty degrees, relative to the axis of the reamer body, while all the faces 34 are at another angle, for instance forty-five degrees, relative to said axis. These numbers are arbitrary, as different angles can be used for forming the cutting edges 28 and 30 at different desired angles to fit valve seats or other surfaces cut at different angles.

In Figure 3, I show how the faces 32 can be ground, either for the initial grinding of the reamer, or for re-sharpening thereof when the same is dull. The grinding machine comprises a base 36, a motor 38, or other suitable power means, a grinding wheel 40, a guideway 42, a reamer carriage 44 slidable on the guideway and an arbor clamp 46 for an arbor 48 on which the reamer body A can be mounted.

The arbor clamp 46 is rotatably adjustable relative to the carriage 44 so that the proper angle for the faces 32, as in Figure 3, or for the faces 34, as in Figure 4, can be procured. The arbor 48 is rotatable in the clamp 46 so that it can be rotated to different positions for the different faces 32 or 34 and thus the faces progressively ground.

The guideway 42 is adjustable to angles other than right angles relative to the shaft of the grinding wheel 40 to procure a hollow ground effect, as illustrated in Figure 5. In this figure, the grinding wheel is shown at an angle because of the figure being taken on a line parallel with the travel of the carriage 44. This makes the left edge of the grinding wheel appear convex for thus producing concavity in the faces 32 and 34.

After the grinding machine is set up, as in Figure 3, the five faces 32 are first ground by successive forward motions of the carriage 44 and seventy-two degree rotations of the reamer A. The machine is then reset, as in Figure 4 and the same process repeated for grinding the faces 34.

If the carriage 44 travelled at right angles to the axis of the grinding wheel 40, the faces 32 and 34 would not be hollow ground, but would be plane faces. Consequently the cutting edges 28 and 30 would be true straight edges. By hollow grinding, the faces 32 and 34, where they intersect at the cutting edges 28 and 30, produce slight curvature in the cutting edges, as illustrated in Figure 6 wherein the curvature is greatly exaggerated inasmuch as on the actual reamer it is not more than two or three thousandths depression per lineal inch of cutting edge.

This slight curvature is produced by the curvature of the faces 32 and 34 being the same, or in other words, keeping the guideway 42 at the same angle with respect to the grinding wheel when both the edges 32 and 34 are ground. Thus the slight curvature can be produced without any complicated resetting of the grinding machine.

As shown in Figure 7, a valve closure member 50 is seated against a reamed seat 14a. The edge of the member 50 being straight will efficiently seat on the slightly curved seat 14a with a somewhat wedging action, which under actual tests has proven to be very desirable, as a valve seated on a valve seat reamed by my reamer will hold against much more pressure than where the seat is reamed by other types of reamers having straight cutting edges rather than slightly curved ones. The very slight curve however is automatically and easily produced by the simple settings of the grinding machine and sliding operations of the carriage 44, as hereinbefore set forth.

Intermediate faces 52 are formed on a radius from the axis of the reamer body and these are hollow ground, as indicated at 54, longitudinally of the reamer axis.

Thus relieved cutting edges are provided, as indicated at 56 in Figure 8, for cutting a rim 58 around valve seats which have been reamed quite a number of times before, so that the reamer cuts quite deep with respect to the upper surface of the valve seat. The hollow grinding at 54 prevents dragging of the intermediate faces 52 on the rim 58, but provides instead a cutting means for such rim.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a reamer construction, a reamer shank and a reamer body, said reamer body having a plurality of alternate faces having similar characteristics separated by a second plurality of alternate faces having other similar characteristics, each face of said first plurality of faces being slightly concave, being tangent to a circumference line at any plane intersecting the axis of said shank at right angles, having its sides equidistant from a radial line at right angles to the center of said face and being at a predetermined angle relative to the axis of said shank and each face of said second plurality of faces being slightly concave, being tangent to a circumference line at any plane intersecting the axis of said shank at right angles, having its sides equidistant from a radial line at right angles to the center of said face and being at a different predetermined angle relative to the axis of said shank whereby the cutting edges formed by intersections of the successive faces are non-radial.

2. In a reamer construction, a reamer shank and a reamer body, said reamer body having a plurality of alternate faces having similar characteristics separated by a second plurality of alternate faces having other similar characteristics, each face of said first plurality of faces being tangent to a circumference line at any plane intersecting the axis of said shank at right angles, having its sides equidistant from a radial line at right angles to the center of said face and being at a predetermined angle relative to the axis of said shank and each face of said second plurality of faces being tangent to a circumference line at any plane intersecting the axis of said shank at right angles, having its sides equidistant from a radial line at right angles to the center of said face and being at a different predetermined angle relative to the axis of said shank whereby the cutting edges formed by intersections of the successive faces are non-radial.

MAXIMILLIAN R. MESING.